(12) United States Patent
Umapathi et al.

(10) Patent No.: US 12,086,854 B1
(45) Date of Patent: Sep. 10, 2024

(54) LOCATION BASED VEHICLE TRANSACTIONS

(71) Applicant: Wells Fargo Bank, N.A., San Francisco, CA (US)

(72) Inventors: Vasudev Tumkur Umapathi, Bengaluru (IN); Ramesh Chinnasamy, Bengaluru (IN); Rameshchandra Bhaskar Ketharaju, Hyderabad (IN); Ramanathan Ramanathan, Bellevue, WA (US); Shanmukeswara Rao Donkada, Hyderabad (IN); Parul Ghosh, Bangalore (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 17/939,374

(22) Filed: Sep. 7, 2022

Related U.S. Application Data

(63) Continuation of application No. 16/576,320, filed on Sep. 19, 2019, now Pat. No. 11,468,486.

(60) Provisional application No. 62/736,177, filed on Sep. 25, 2018.

(51) Int. Cl.
| | |
|---|---|
| *G06Q 30/00* | (2023.01) |
| *G06Q 30/0601* | (2023.01) |
| *G06Q 30/0645* | (2023.01) |
| *G06Q 40/03* | (2023.01) |
| *H04W 4/029* | (2018.01) |

(52) U.S. Cl.
CPC ..... *G06Q 30/0617* (2013.01); *G06Q 30/0645* (2013.01); *G06Q 40/03* (2023.01); *H04W 4/029* (2018.02)

(58) Field of Classification Search
CPC .............. G06Q 30/0617; G06Q 40/03; G06Q 30/0645; H04W 4/029
USPC ...................................................... 705/26, 27
See application file for complete search history.

(56) References Cited

U.S. PATENT DOCUMENTS

| | | | |
|---|---|---|---|
| 7,908,210 | B2 | 3/2011 | Huber et al. |
| 8,271,339 | B2 | 9/2012 | Arunachalam |
| 8,660,943 | B1 | 2/2014 | Chirehdast |
| 8,671,051 | B1 | 3/2014 | Sandoval |
| 2007/0136162 | A1 | 6/2007 | Thibodeau et al. |
| 2008/0015954 | A1* | 1/2008 | Huber .................... G06Q 30/06 705/28 |
| 2009/0144188 | A1 | 6/2009 | Colabucci |

(Continued)

OTHER PUBLICATIONS

Pearl Technology Holdings, LLC, "PR Newswire: a CISION Company", Available Online at <https://dialog.proquest.com/professional/docview/1773283917/180908B436B56D45ADE/1?accountid=131444>, Mar. 15, 2016, 3 pages.

(Continued)

*Primary Examiner* — Robert M Pond
(74) *Attorney, Agent, or Firm* — K&L Gates LLP

(57) ABSTRACT

Vehicle transactions can be facilitated based on location. A customer location can be tracked relative to vehicles at a dealer location. A customer in close proximity to a particular vehicle at a dealer location can be detected, and a finance agreement can be generated between a financing party, the customer, and the dealer of the vehicle based on the detection of the customer and the vehicle. Further, a mechanism is provided to aid execution of the finance agreement as a contract between the customer, the financing party, and the dealer to finalize a sale or lease of the vehicle.

20 Claims, 7 Drawing Sheets

(56) References Cited

U.S. PATENT DOCUMENTS

| | | |
|---|---|---|
| 2010/0094697 A1 | 4/2010 | Cavanaugh |
| 2013/0117173 A1 | 5/2013 | Schwarz et al. |
| 2013/0211916 A1 | 8/2013 | Putman |
| 2014/0195098 A1* | 7/2014 | Lorenz ................. G07C 5/0808 |
| | | 701/29.3 |
| 2014/0279275 A1 | 9/2014 | Burgiss et al. |
| 2015/0032640 A1* | 1/2015 | Esselink .............. G06Q 30/016 |
| | | 705/304 |
| 2015/0039490 A1 | 2/2015 | Forrester et al. |
| 2015/0081663 A1 | 3/2015 | Raniere |
| 2015/0170253 A1 | 6/2015 | Kim et al. |
| 2016/0063550 A1 | 3/2016 | Caldwell |
| 2016/0171555 A1 | 6/2016 | Buerger et al. |
| 2016/0232546 A1 | 8/2016 | Ranft et al. |
| 2016/0253706 A1* | 9/2016 | Kursar ............... G06Q 30/0613 |
| | | 705/14.58 |
| 2016/0364804 A1 | 12/2016 | Olson |
| 2018/0053253 A1 | 2/2018 | Gokhale et al. |
| 2018/0060954 A1 | 3/2018 | Yin et al. |
| 2018/0089757 A1 | 3/2018 | Forrester et al. |
| 2018/0114238 A1 | 4/2018 | Treiser |
| 2019/0171769 A1 | 6/2019 | Kurian et al. |

OTHER PUBLICATIONS

Sawyers, Arlena, "Jump-starting car sales from the service lane: Tool offers financing, suggests vehicles", Automotive News, vol. 89, Issue 6663, Crain Communications, Incorporated, Mar. 9, 2015, 3 pages.

* cited by examiner

LOCATION BASED VEHICLE TRANSACTIONS

CROSS-REFERENCE TO RELATED APPLICATIONS

This application is a continuation of U.S. patent application Ser. No. 16/576,320, titled "LOCATION BASED VEHICLE TRANSACTIONS," filed Sep. 19, 2019, which claims priority to U.S. Provisional Patent Application No. 63/736,177, titled, "LOCATION BASED VEHICLE TRANSACTIONS," filed Sep. 25, 2018, the contents of which are incorporated herein by reference in their entirety.

BACKGROUND

When a customer is interested in purchasing or leasing a vehicle, the customer often visits a car dealership. Dealers and financing parties are usually operating without any knowledge of a customer in terms of potential loan options or a vehicle of interest, prior to the customer's actual interaction with the dealer. The process of reviewing a customer's financial details or interest in a car only happens once the customer arrives at the dealership and begins the process of discussing financing options. There is also a considerable time cost attached to determining financing options once a car has been selected.

BRIEF SUMMARY OF THE DESCRIPTION

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

Briefly described, the subject disclosure pertains to facilitating vehicle transactions in view of customer location. Customer location can be tracked relevant to one or more dealer locations to determine when a customer is present at a dealer location. Further, proximity of a customer to a particular vehicle can be determined. Information about a vehicle can be provided to the customer when in proximity of the particular vehicle. Further, customer preferences or requirements can be considered and utilized to identify and direct a customer to matching vehicles. Furthermore, offers can be made to customers within proximity of a vehicle including financing offers. Moreover, a finance agreement can be automatically generated between a financing party, the customer, and a dealer of the vehicle.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
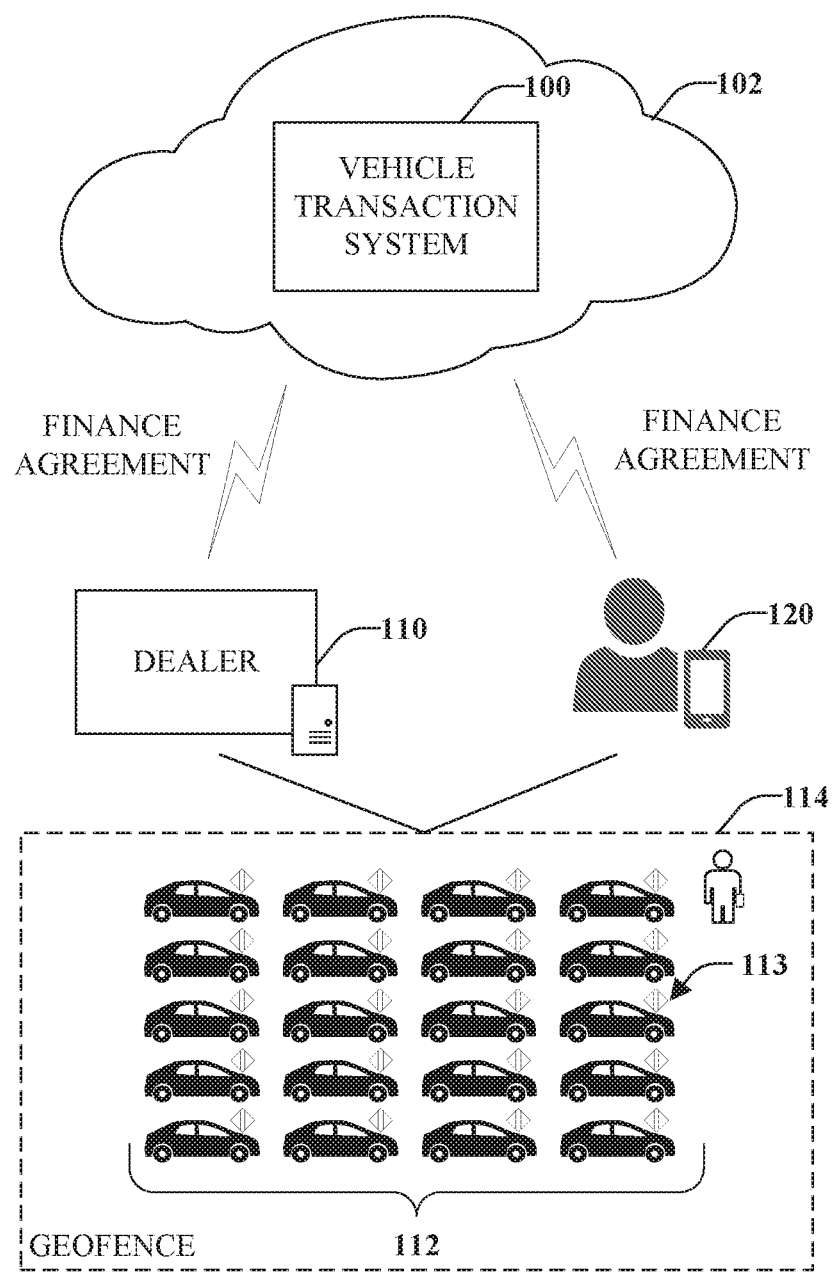
FIG. 1 illustrates an example implementation of aspects of the subject disclosure.

Vehicle shopping is an inefficient process. A potential customer interested in purchasing a vehicle goes to a dealer location and provides an agent of the dealer information regarding preferences or requirements with respect to a vehicle. For example, the customer may prefer a sport utility vehicle with seating for seven and less than fifty-thousand miles. The agent will next perform a search of the dealer inventory to locate vehicles that match the customer's requirements. The agents can then show the matches to the customer. Once the customer settles on a vehicle, negotiation between the customer and the dealer can occur resulting in the dealer providing particular offers such as free maintenance, reduced price, or cash back to close the sale. Subsequently, financing may need to be explored involving a bank. The dealer will work with a bank and provide the individual some finance offers such as zero or low interest rate vehicle loans based on credit score. After a user accepts some combination of offers from the dealer and bank, paperwork is prepared and executed.

The subject disclosure pertains to location-based vehicle transactions. A user can specify vehicle preferences or requirements with a user device such as a smart phone or tablet computer. A dealer can provide information regarding location and vehicle inventory. Vehicles at a dealer that best match the preferences or requirements of the user can be identified and presented on the user device automatically without dealer agent intervention. In one instance, the matches can be provided after a user is determined to be located at a dealer based on location functionality of the user device. Additionally, functionality is provided that can push further information about a vehicle (e.g., miles, usage, location history, accident history . . . ) to the user device when the user is determined to be in proximity with the vehicle. Dealer offers (e.g., free maintenance, cash back . . . ) can also be pushed to the user device regarding matching vehicles. Further, finance offers can be provided from a bank for matching vehicles. Financial agreements can be generated dynamically for execution based on information known about the user, dealer, and vehicle. For instance, the financial agreement can be an electronic contract between dealer, bank, and customer. Aspects of the disclosure are advantageous in at least that the streamline a financing agreement between the customer, financing party, and the dealer, and provide more knowledge to a customer about a vehicle and cost to aid selection.

Various aspects of the subject disclosure are now described in more detail with reference to the annexed drawings, wherein like numerals generally refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

FIG. 1 illustrates an example implementation of aspects of the subject disclosure described further herein. Vehicle transaction system 100 provides functionality associated with efficient vehicle shopping. In accordance with one embodiment, the vehicle transaction system 100 can be a network accessible service. Here, the vehicle transaction system 100 is illustrated in network cloud 102 and can thus be termed a cloud-based service. The vehicle transaction system 100 can interact with a dealer 110, or more specifically one or more computers of the dealer 110, and a user by way of a user device 120 (e.g., smart phone, tablet, laptop, watch . . . ).

The dealer 110 can provide information regarding the dealer to the vehicle transaction system 100. For instance, the dealer 110 can provide information regarding current inventory of vehicles 112. Information about dealer location can also be provided, among other things. Furthermore, vehicles can include, be provided with, or associated with network connected devices 113 (illustrated as a square sensor associated with each vehicle) that communicate information about a particular vehicle. For example, a dealer can place a device (e.g., Internet of Things (IoT) device) inside a car that can communicate or cause communication of such information.

User device 120 can also interact with the vehicle transaction system 100 to aid in a vehicle purchase or lease. In one instance, an application can be downloaded from the vehicle transaction system 100 and installed on the user device 120 to at least split functionality and associated computation as well as facilitate communication between the vehicle transaction system 100 and the user device 120. Utilizing the application, a user can specify preferences or requirements regarding a desired vehicle and other information to facilitate automatic matching to dealer vehicle inventory 112.

Based on information regarding a dealer location, the vehicle transaction system 100 can construct a virtual geographic boundary, or geofence, that enables an action to be triggered when a user device 120 enters or leaves a particular area. In this case, when a user enters a geofenced area of a dealer, the vehicle transaction system 100 can notify the dealer of the user's presence. Further, directions to vehicles that match preferences or requirements of the user can be presented on the user device 120. Furthermore, when a user approaches a vehicle as determined by proximity of the user device 120 to a vehicle device 113, information can be communicated about the vehicle to the user device 120 for presentation. For example, vehicle information can include make, model, year, location history, or repair record, among other things. In addition to vehicle information, dealer offers can be generated and provided to the user device 120 for presentation. For instance, the offers can be for a discount, free service (e.g., oil change, tire rotation . . . ), or cashback. Still further, the vehicle transaction system 100 can generate a financial offer, such as a finance agreement for purchase or lease of a vehicle based on user credit worthiness. The vehicle transaction system 100 can dynamically generate and transmit loan documents to the dealer and user for execution. The loan documents can be automatically generated with information pre-provided by the user and dealer to the vehicle transaction system 100. In other words, finance variables can be identified and values acquired based on analyzing user, vehicle, and dealer information. As a result, users can receive a large amount of information regarding the car, dealer, and finance options in near real time upon being in close proximity of the car. Further, a sale can be completed expeditiously after the user agrees to purchase the car.

Figure 2:
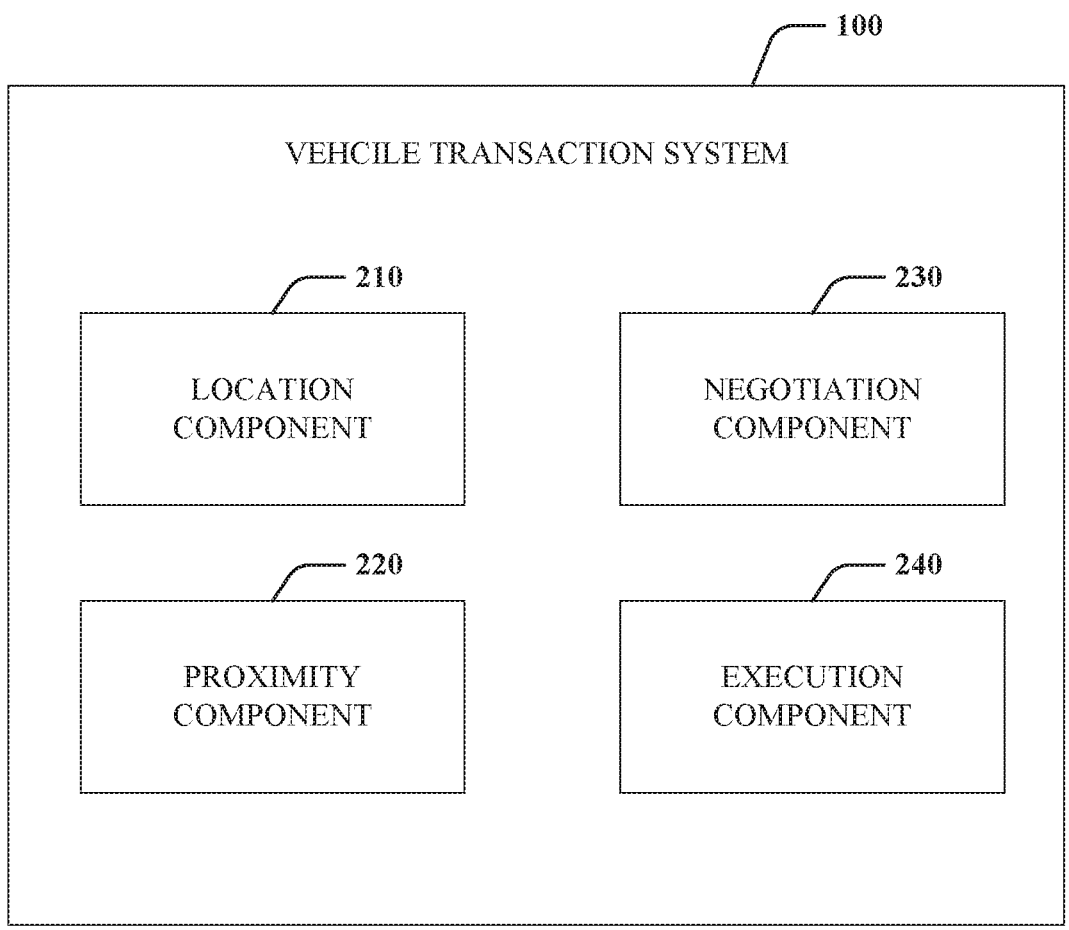
FIG. 2 illustrates an example component diagram of a system of the present innovation.

FIG. 2 illustrates a component diagram of a sample vehicle transaction system 100. The vehicle transaction system 100 includes a location component 210, proximity component 220, negotiation component 230, and execution component 240. Functionality of the vehicle transaction system 100 can be split across computing resources including dealer computers and the user device 120. For example, a subset of functionality can be provided through an application on the user device 120. Accordingly, although the functionality is attributed to the vehicle transaction system 100 in the figure and description, it is to be appreciated that such functionality need not be confined to a single compute resource.

The location component 210 tracks a location of a customer or more specifically, the user device 120 of the customer. In some embodiments, the location component 210 is a global positioning satellite (GPS) component in the user device 120 configured to track and/or determine the customer's GPS coordinates. Further, the location component 210 can be configured to produce a geofence around a dealer location, such that detection of the presence of a user at or approaching a dealership can be detected, for instance based on GPS associated with the user device 120.

The proximity component 220 detects a customer and/or customer device when it is in proximity to a vehicle at a dealer location. In some embodiments, the proximity component 220 tracks the location of the customer from the location component 210 in relation to the proximity component 220. In other embodiments, the location component 210 tracks the location of the customer in relation to a predetermined radius from the proximity component 220.

The proximity component 220 is associated with a vehicle at the dealer location. In some embodiments, the proximity component 220 is an RFID tag, nearfield communication (NFC) tag, GPS beacon, internet of things (IOT) device, and/or the like. The proximity component 220 is affixed, associated, or placed near a vehicle at the dealer location. In some embodiments, a proximity component 220 is affixed to or included within each vehicle in the dealer location. The proximity component 220 can correspond to the vehicle device 113 of FIG. 1.

The negotiation component 230 generates a finance agreement. The finance agreement can be between a financing party, the customer, and a dealer of the vehicle based on the detection of the customer near the vehicle. The negotiation component 230 determines finance variables for the finance agreement. The finance variables can include at least one of down payment, monthly payment, interest rate, total amount financed, special offers, and/or the like.

In some embodiments, the negotiation component 230 determines the finance variables based on customer information. The negotiation component 230 analyzes customer information to facilitate a finance agreement or vehicle selection. The negotiation component 130 can compile the customer information. The customer information can include customer financial data, account information, insurance information, driving history, family data, customer vehicle history, and/or the like. The negotiation component 230 analyzes the customer data to determine the finance variables for the finance agreement. For example, the negotiation component 230 can receive a credit score from the customer financial data to determine interest rate or down payment required for the customer to purchase the vehicle.

In some embodiments, the negotiation component 230 determines a customer vehicle from the analyzed customer information. The customer vehicle is a vehicle owned by the customer presently. The negotiation component 230 can determine the customer vehicle by analyzing a customer purchase history, social media data, and/or the like. The negotiation component 230 determines a trade-in value of the customer vehicle. The negotiation component 230 can determine the trade-in value by accessing a vehicle resource value guide, online resource, and/or the like. The negotiation component 230 can determine the down payment based on the trade-in value. In some embodiments, the negotiation component 230 mitigates a determined down payment with the trade-in value. In other embodiments, the negotiation component 130 reduces a monthly payment based on the trade-in value.

In some embodiments, the negotiation component 230 can facilitate vehicle selection at the dealer location based on the analysis of the customer information. The negotiation component 230 can determine the vehicle in proximity to the customer does not match the customer based on the analysis of customer information. The negotiation component 230 can determine an alternative vehicle that matches the customer at the dealer location and direct the customer to the vehicle such that the customer is in proximity of the alternative vehicle. For example, the customer can be in proximity to a sports car. The negotiation component 230 analyzes the customer information to determine the customer's family status. The customer has a wife and three children, making the sports car impractical. The negotiation component 230 can determine a sport utility vehicle (SUV) or van matches the customer based on the analysis and directs the customer to an alternative vehicle at the dealer location or dealer lot.

The execution component 240 is a mechanism that facilitates execution of a finance agreement as a contract between the customer, the financing party, and the dealer to finalize a sale or lease of the vehicle. The execution component 140 can request and receive digital signatures, e-Sign, written signatures, and/or the like or combination thereof from the customer, the financing party, and the dealer to finalize the agreement.

Figure 3:
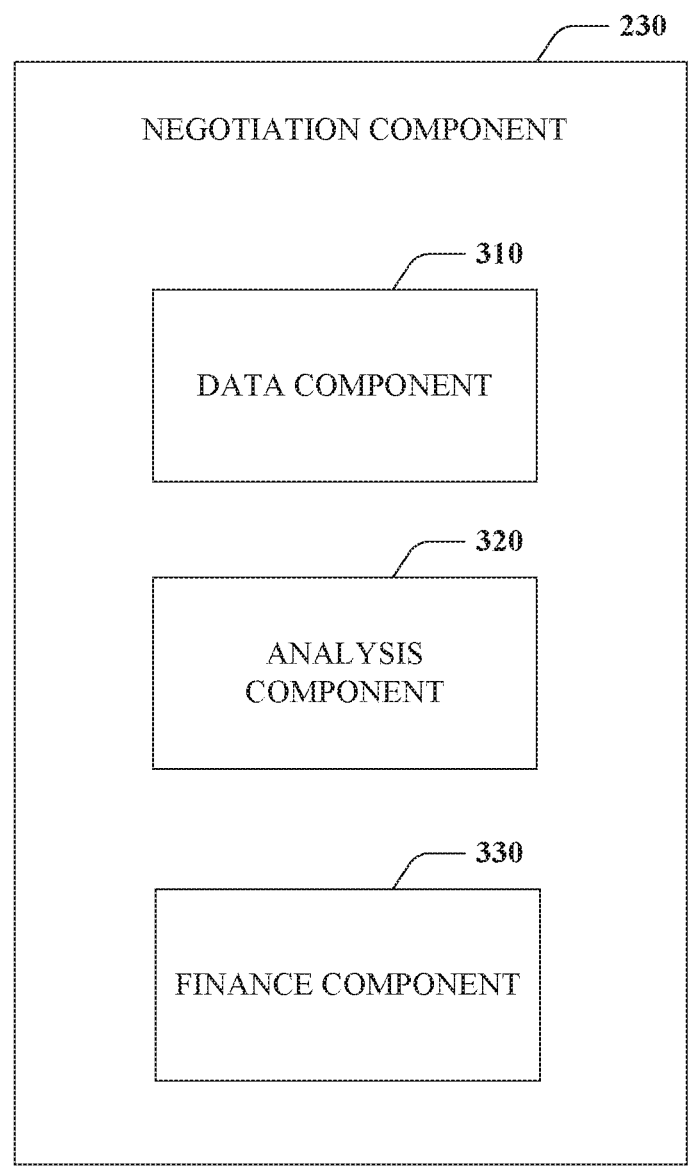
FIG. 3 illustrates an example component diagram of a negotiation component.

FIG. 3 illustrates a detailed component diagram of the negotiation component 230. The negotiation component 230 includes data component 310. The data component 310 compiles customer information from various data sources. The customer information can include customer financial data, account information, insurance information, driving history, family data, customer vehicle history, and/or the like. For example, the data component 310 can access a financial institution to retrieve customer information such as credit score, income, net worth, and/or the like. The data component 310 can also access a customer driving history or vehicle history, among other things.

The negotiation component 230 also includes analysis component 320. The analysis component 320 analyzes the customer data to determine the finance variables for the finance agreement. For example, the analysis component 320 can receive a credit score from the customer financial data to determine interest rate or down payment required for the customer to purchase the vehicle.

The negotiation component 230 further includes finance component 330. The finance component 330 determines the finance variables based on the analysis of the customer information. In some embodiments, the finance component 330 can auto-fill a financing application with the finance variables. The finance component 330 generates the financing agreement based on the finance variables.

In some embodiments, the analysis component 320 determines a customer vehicle from the analyzed customer information. The customer vehicle is a vehicle owned by the customer presently. The analysis component 320 can determine the customer vehicle by analyzing a customer purchase history, social media data, and/or the like. The analysis component 320 determines a trade-in value of the customer vehicle. The analysis component 320 can determine the trade-in value by accessing a vehicle resource value guide, online resource, and/or the like. The finance component 330 can determine the down payment based on the trade-in value. In some embodiments, the finance component 230 mitigates a determined down payment with the trade-in value. In other embodiments, the negotiation component 130 reduces a monthly payment based on the trade-in value.

In some embodiments, the analysis component 320 can facilitate vehicle selection at the dealer location based on the analysis of the customer information. The analysis component 320 determines the vehicle in proximity to the customer does not match the customer based on the analysis of customer information. The analysis component 320 can determine an alternative vehicle that matches the customer at the dealer location and direct the customer to the vehicle such that the customer is in proximity of the alternative vehicle.

For example, the customer can be in proximity to a sports car. The analysis component 320 analyzes the customer information to determine the customer's family status. The customer has a wife and three children, making the sports car impractical. The analysis component 2320 can determine an SUV or van matches the customer based on the analysis and directs the customer to an alternative vehicle at the dealer location or dealer lot.

Figure 4:
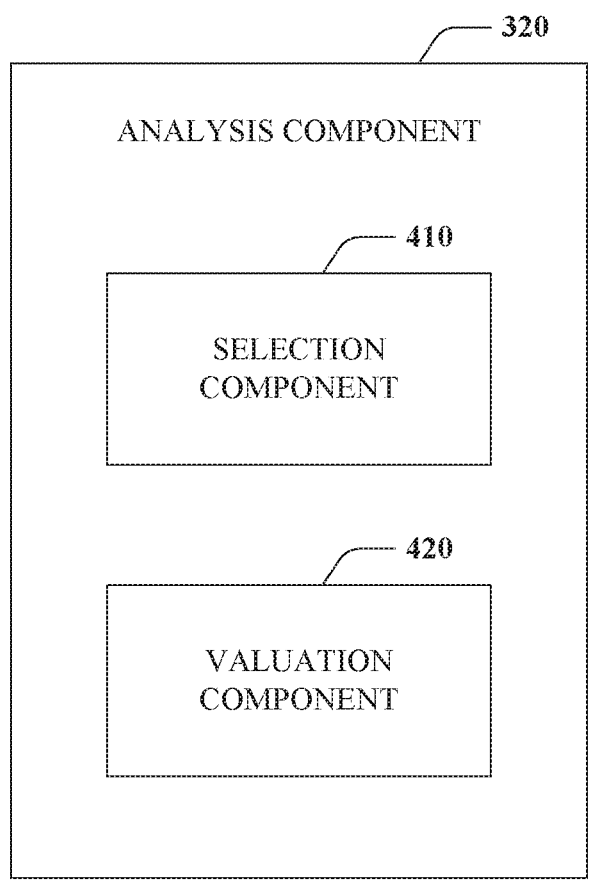
FIG. 4 illustrates an example component diagram of an analysis component.

FIG. 4 illustrates a detailed sample component diagram of the analysis component 320. The analysis component 320 includes selection component 410. The selection component 410 facilitates vehicle selection at the dealer location based on the analysis of the customer information. The selection component 410 determines the vehicle in proximity to the customer does not match the customer based on the analysis of customer information. The selection component 410 determines an alternative vehicle that matches the customer at the dealer location and directs the customer to the vehicle such that the customer is in proximity of the alternative vehicle.

For example, the customer can be in proximity to a sports car. The selection component 410 analyzes the customer information to determine the customer's family status. The customer has a wife and three children, making the sports car impractical. The selection component 410 can determine an SUV or van matches the customer based on the analysis and directs the customer to an alternative vehicle at the dealer location or dealer lot.

In some embodiments, the analysis component 320 includes valuation component 420. The valuation component 420 determines a customer vehicle from the analyzed customer information. The customer vehicle is a vehicle owned by the customer presently. The valuation component 420 can determine the customer vehicle by analyzing a customer purchase history, social media data, and/or the like. The valuation component 420 determines a trade-in value of the customer vehicle. The valuation component 420 determines the trade-in value by accessing a vehicle resource value guide, online resource, and/or the like. The finance component 330 can determine the down payment based on the trade-in value from the valuation component 420. In some embodiments, the finance component 330 mitigates, or reduces, a determined down payment with the trade-in value. In other embodiments, the negotiation component 130 reduces a monthly payment based on the trade-in value.

The aforementioned systems, architectures, platforms, environments, or the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull control model. The components may also interact with one or more other components not specifically described herein for sake of brevity, but known by those of skill in the art.

Furthermore, various portions of the disclosed systems above and methods below can include or employ artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers . . . ). Such components, among other things, can automate certain mechanisms or processes performed thereby to make portions of the systems and methods more adaptive as well as efficient and intelligent. By way of example, and not limitation, such mechanisms can be utilized by vehicle transaction system 100 to predict vehicles of interest, determine an optimal path to the vehicle, and estimate the value of a trade in vehicle.

Figure 5:
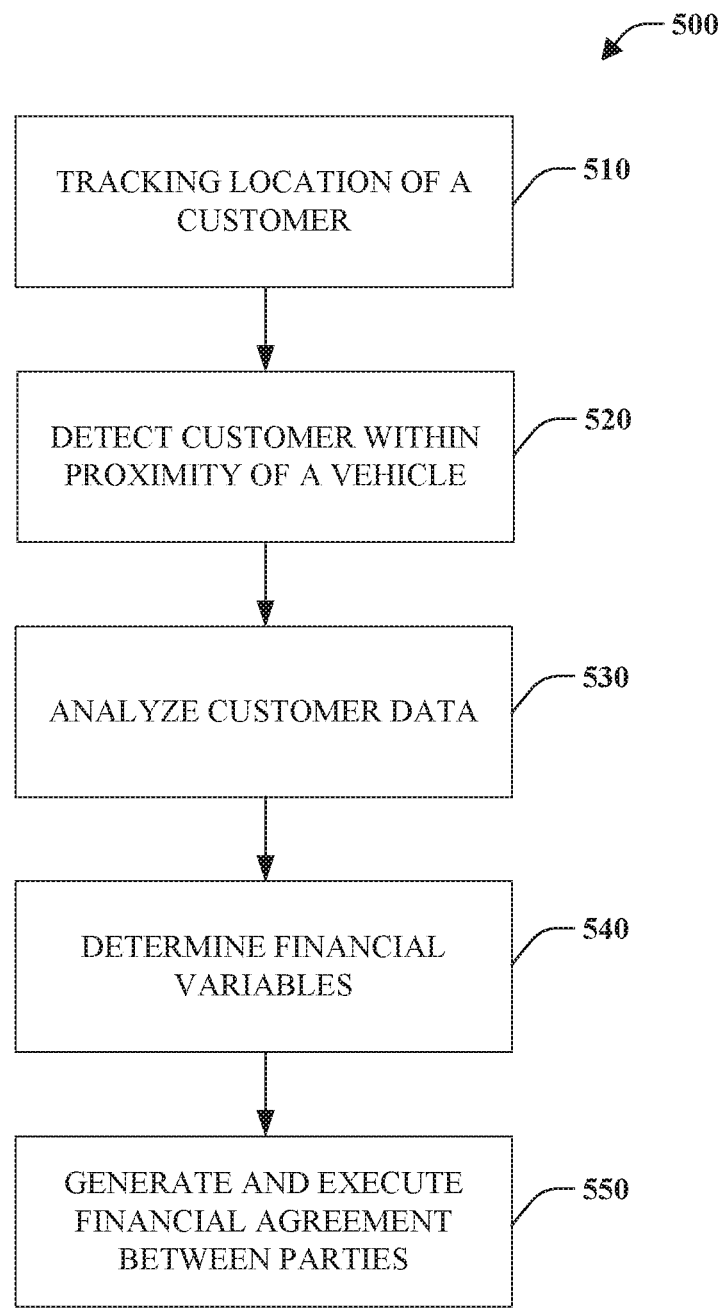
FIG. 5 illustrates a method for location based vehicle transactions.
Figure 6:
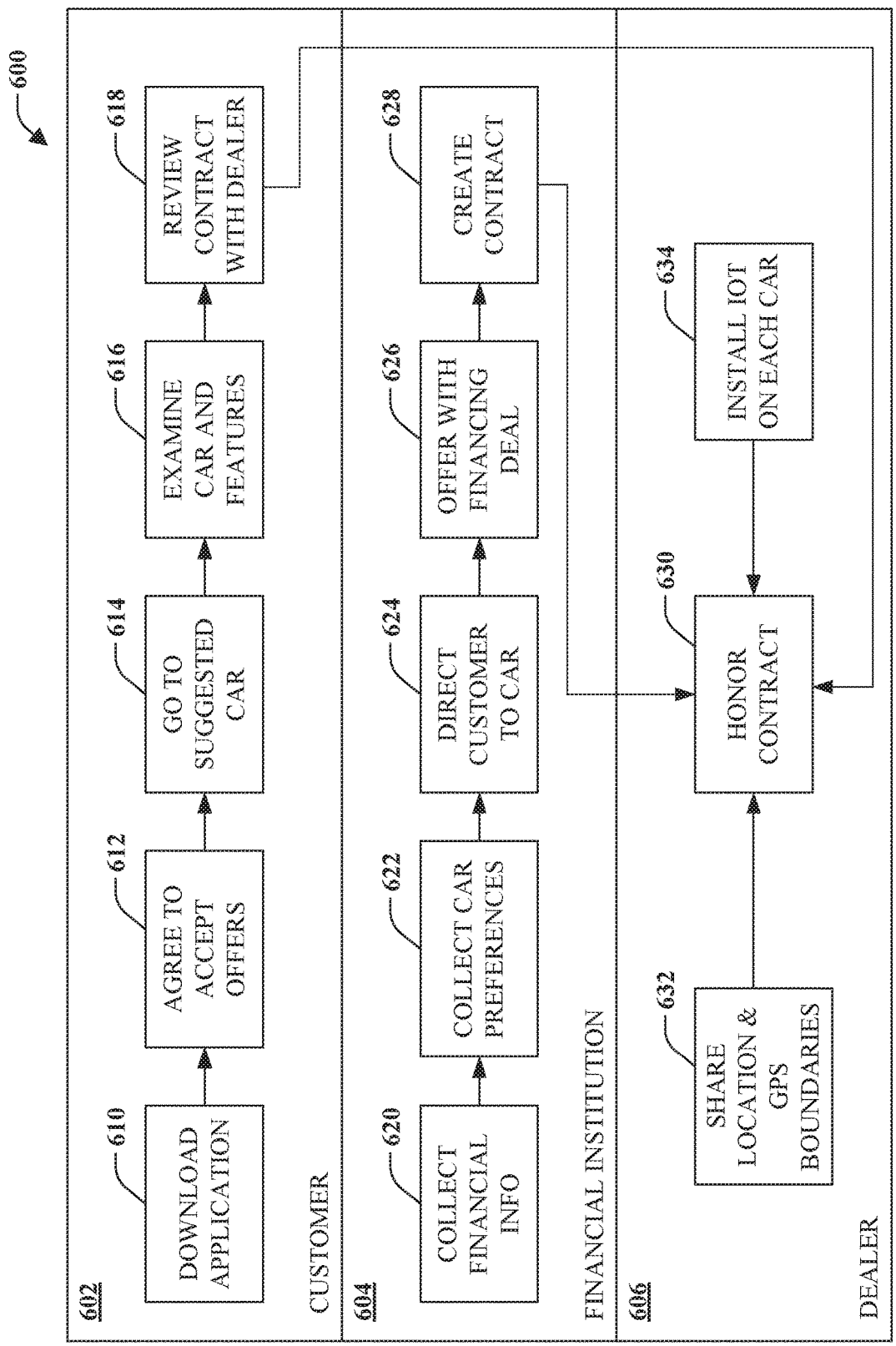
FIG. 6 depicts process flow across multiple entities associated with vehicle transaction processing.

In view of the exemplary systems described above, methods that may be implemented in accordance with the disclosed subject matter will be better appreciated with reference to flow chart diagrams of FIGS. 5 and 6. While for purposes of simplicity of explanation, the methods are shown and described as a series of blocks, it is to be understood and appreciated that the disclosed subject matter is not limited by the order of the blocks, as some blocks may occur in different orders and/or concurrently with other blocks from what is depicted and described herein. Moreover, not all illustrated blocks may be required to implement the methods described hereinafter. Further, each block or combination of blocks can be implemented by computer program instructions that can be provided to a processor to produce a machine, such that the instructions executing on the processor create a means for implementing functions specified by a flow chart block.

FIG. 5 illustrates a method 500 for location based vehicle transactions, which can be implemented by vehicle transaction system 100. At 510, a location of a customer is tracked. The customer location can be tracked using GPS location, WiFi triangulation, or other mechanisms (e.g., visual analysis of surroundings in comparison to known elements of a location). In accordance with one embodiment, the user device 120 can employ location functionality and provide the location to the vehicle transaction system 100.

At 520, the customer can be detected to be within proximity of a distinct vehicle at the dealer location. The customer can be detected using GPS, NFC, Bluetooth, WiFi triangulation, and/or the like. For example, proximity component or vehicle device can receive a signal broadcast by the user device 120 or broadcast a signal that can be received by the user device 120 when in proximity.

At 530, customer data can be retrieved and analyzed. For instance, the customer data can include a credit score, trade in, and preferences, among other things. The customer data can be provided by a user by way of a user device, 120. Alternatively, the customer data can be collected from external sources such as a credit bureau or associated service.

At 540, financial variables are determined. The financial variables are determined based on the analysis of the customer data. The financial variables can be monthly payment, amount financed, trade-in value, down payment, interest rate, and/or the like.

At 550, a financial agreement is generated and executed between the customer, the financing party, and the dealer. The financial agreement is automatically populated with customer information, dealer information, financing party information, the determined finance variables, and/or the like. The financial agreement is executed by receiving signatures, electronic signatures, and/or other authenticating methods from each party.

FIG. 6 is a swim lane diagram 600 depicting process flow across multiple entities m accordance with one particular embodiment of vehicle transaction processing. There are three lanes illustrated, namely customer lane 602, financial institution lane 604, and dealer lane 606.

The customer lane 602 includes activities performed by a customer with respect to locating and purchasing a car. At 610, an application is downloaded onto a user device 120 of the customer. In accordance with one embodiment, the application can be provided by a bank associated with vehicle transaction processing. At 612, the customer agrees to accept offers by way of the application. At 614, the customer can go to a dealer and in particular to a car suggested by the application that matches customer preferences or requirements. At 616, the customer can examine the car and features to determine whether or not to purchase the car. At 618, a contract with the dealer is received and the terms reviewed to determine whether or not to accept the contract and purchase the car.

The financial institution lane 604 illustrates process flow of a financial institution such as a bank with respect to vehicle transaction processing. At 620, financial information is collected about the customer. For instance, the financial information can correspond to transactions and a credit score. At 622, car preferences are collected. In accordance with one embodiment, a customer can provide such preferences by way of an application communicatively coupled to the financial institution. At 624, the car is suggested to a customer and the customer is directed to examine the car. At 626, a financial offer is provided to the customer associated with the suggested car. For example, a loan offer can be generated with a particular interest rate based on the credit score of the customer and the car. At 628, a contract is created for purchase or lease of the car between the customer, dealer, and bank. The contract can be automatically generated or completed based on previously acquired information regarding the customer, dealer, and car. The contract can correspond to a printable paper contract or an electronic contract. In accordance with one embodiment, the contract can be a smart contract, which is a self-enforcing contract with terms embedded in computer code managed by a block chain.

The dealer lane 606 includes actions associated with selling a car to a customer utilizing financing. At 606, the contract created by the financial institution and being considered by the customer is accepted or honored by the dealer. At 632, location and GPS boundaries of the dealer and the dealer inventory are shared with the financial institution and the customer. Further, at 634, Internet of Things (IoT) devices are installed, attached, or otherwise associated with each car in the dealer inventory to facilitate proximity based interaction and access to information associated with purchasing a car.

The subject disclosure has been described in context of vehicles and purchase of such vehicles. Herein, vehicle is intended encompass various means for transporting people or things including cars, trucks, tractors, carts, motor cycles, and boats, among others. Further, the subject disclosure is not limited to vehicles. For example, the system can be adapted to operate with respect to various other products or services such as, but not limited to, commercial or residential real estate and high cost electronics such as televisions and computers. For example, the inventory can be homes, warehouses, or apartments, and the dealers are real estate agents or companies in this context.

Aspects of the subject disclosure pertain to the technical problem of provisioning purchase assistance in conjunction with one or more computing devices. Technical features associated with addressing this problem include, among other things, determining a location and proximity of a computing device for with inventory items at a particular location, suggesting products or services based on preferences or requirements, determining financial offers, and automatically generating contracts between a buyer, seller, and financial institution.

The subject disclosure provides for various products and processes that perform, or are configured to perform, purchase assistance based on device location. What follows are an exemplary system, method, and computer-readable media.

A system comprises a processor coupled to a memory that stores instructions that when executed cause the processor to: track a location of a customer; detect a customer in close proximity to a vehicle at a dealer location; and generate a finance agreement between a financing party, the customer, and a dealer of the vehicle based on the detection of the customer and the vehicle. The system further comprises instructions that cause the processor to execute the finance agreement as a contract between the customer, the financing party, and the dealer to finalize a sale or lease of the vehicle. Further, the system comprises instructions that cause the processor to analyze customer information with respect to generating a finance agreement or suggesting a vehicle. Customer information complied including at least one of financial data, account information, insurance information, driving history, family data, or customer vehicle history. The system further comprises instructions that cause the processor to determine financing variables based on the analyzed customer information, the financing variables include at least one of down payment, interest rate, or total amount financed. Furthermore, the system comprises instructions to determine a customer vehicle from the analyzed customer information; determine a trade-in value of the customer vehicle by accessing a vehicle resource value guide; and reduce a determined down payment with the trade-in value. The system further comprises instructions that cause the processor to determine the vehicle does not match the customer based on the analysis of customer information; and determine an alternative vehicle that matches the customer that is at the dealer location. In one instance the alternate vehicle is determined based on customer family status. Additionally, a customer can be detected in close proximity based on input from a radio frequency identification (RFID), global positioning system (GPS), or internet of things (IoT) device.

A method comprises executing, on a processor, instructions that cause the processor to perform operations comprising: tracking a location of a customer relative to a dealer location; detecting a customer in close proximity to a vehicle at the dealer location; and generating a finance agreement between a financing party, the customer, and a dealer of the vehicle based on the detection of the customer and the vehicle. The method further comprises executing the finance agreement as a contract between the customer, the financing party, and the dealer to finalize a sale or lease of the vehicle. Further, the method comprises analyzing customer information to facilitate generation of a finance agreement or vehicle selection. The customer information can include at least one of financial data, account information, insurance information, driving history, family data, or customer vehicle history. The method further comprises determining financing variables based on the analyzed customer information, the financing variables include at least one of down payment, interest rate, or total amount financed. Furthermore, the method comprises determining a customer vehicle from the analyzed customer information; determining a trade-in value of the customer vehicle by accessing a vehicle resource value guide, and reducing a determined down payment with the trade-in value. The method further comprises determining the vehicle does not match the customer based on the analysis of customer information, and determining an alternative vehicle that matches the customer at the dealer location. In one instance, the alternative vehicle is determined based on customer family status. In accordance with one embodiment, the method can track location of the customer relative to the dealer location by establishing a virtual geographic boundary that detects customer presence when the customer enters the boundary.

A computer-readable storage medium having instructions is configured to control one or more processors to: track a location of a customer relevant to a dealer location; detect a customer in close proximity to a vehicle at the dealer location; generate a finance agreement between a financing party, the customer, and a dealer of the vehicle based on the detection of the customer and the vehicle; and execute the finance agreement as a contract between the customer, the financing party, and the dealer to finalize a sale or lease of the vehicle. The computer-readable storage medium further controls one or more processors to determine a customer vehicle from customer information; determine a trade-in value of the customer vehicle by accessing a vehicle resource value guide; and mitigate a determined down payment of the finance agreement with the trade-in value.

As used herein, the terms "component" and "system," as well as various forms thereof (e.g., components, systems, sub-systems . . . ) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The conjunction "or" as used in this description and appended claims is intended to mean an inclusive "or" rather than an exclusive "or," unless otherwise specified or clear from context. In other words, "'X' or 'Y'" is intended to mean any inclusive permutations of "X" and "Y." For example, if "'A' employs 'X,'" "'A' employs 'Y,'" or "'A' employs both 'X' and 'Y,'" then "'A' employs 'X' or 'Y'" is satisfied under any of the foregoing instances.

Figure 7:
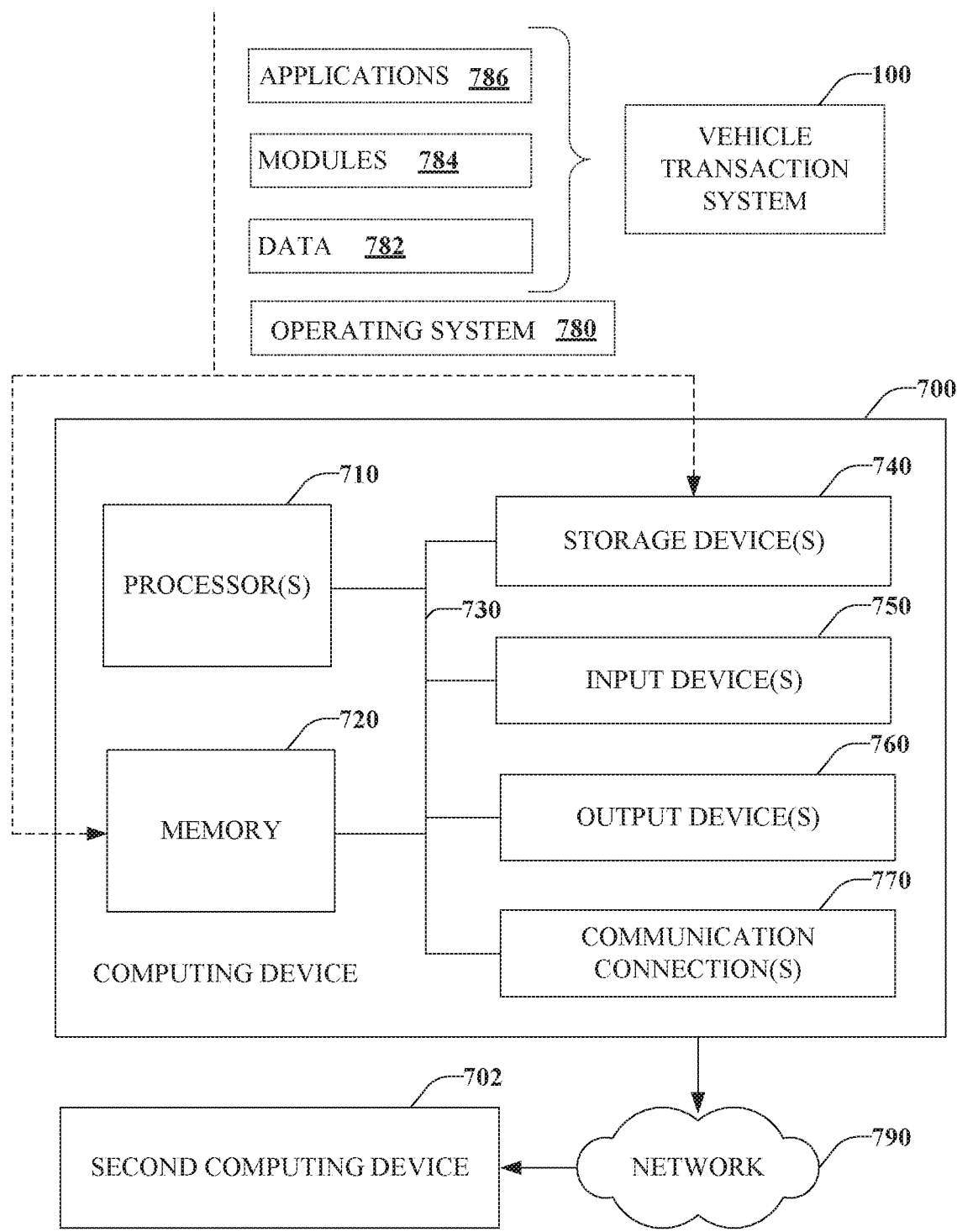
FIG. 7 illustrates a computing environment where one or more of the provisions set forth herein can be implemented, according to some embodiments.

Furthermore, to the extent that the terms "includes," contains, "has," "having" or variations in form thereof are used in either the detailed description or the claims, such terms are intended to be inclusive in a manner similar to the term "comprising" as "comprising" is interpreted when employed as a transitional word in a claim To provide a context for the disclosed subject matter, FIG. 7 as well as the following discussion are intended to provide a brief, general description of a suitable environment in which various aspects of the disclosed subject matter can be implemented. The suitable environment, however, is solely an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, minicomputing devices, server computers, as well as personal computers, hand-held computing devices (e.g., personal digital assistant (PDA), smart phone, tablet, watch . . . ), microprocessor-based or programmable consumer or industrial electronics, and the like. Aspects can also be practiced in distributed computing environments where tasks are performed by remote processing devices that are linked through a communications network. However, some, if not all aspects of the disclosed subject matter can be practiced on stand-alone computers. In a distributed computing environment, program modules may be located in one or both of local and remote memory devices.

With reference to FIG. 7, illustrated is an example computing device 700 (e.g., desktop, laptop, tablet, watch, server, hand-held, wearable, programmable consumer or industrial electronics, set-top box, game system, compute node . . . ). The computing device 700 includes one or more processor(s) 710, memory 720, system bus 730, storage device(s) 740, input device(s) 750, output device(s) 760, and communications connection(s) 770. The system bus 730 communicatively couples at least the above system constituents. However, the computing device 700, in its simplest form, can include one or more processors 710 coupled to memory 720, wherein the one or more processors 710 execute various computer executable actions, instructions, and or components stored in the memory 720.

The processor(s) 710 can be implemented with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 710 may also be implemented as a combination of computing devices, for example a combination of a DSP and a microprocessor, a plurality of microprocessors, multicore processors, one or more microprocessors in conjunction with a DSP core, or any other such configuration. In one embodiment, the processor(s) 710 can be a graphics processor unit (GPU) that performs calculations with respect to digital image processing and computer graphics.

The computing device 700 can include or otherwise interact with a variety of computer-readable media to facilitate control of the computing device to implement one or more aspects of the disclosed subject matter. The computer-readable media can be any available media that accessible to the computing device 700 and includes volatile and non-volatile media, and removable and non-removable media. Computer-readable media can comprise two distinct and mutually exclusive types, namely storage media and communication media.

Storage media includes volatile and nonvolatile, removable, and nonremovable media implemented in any method or technology for storage of information such as computer-readable instructions, data structures, program modules, or other data. Storage media includes storage devices such as memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other like mediums that store, as opposed to transmit or communicate, the desired information accessible by the computing device 700. Accordingly, storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media.

The memory 720 and storage device(s) 740 are examples of computer-readable storage media. Depending on the configuration and type of computing device, the memory 720 may be volatile (e.g., random access memory (RAM)), nonvolatile (e.g., read only memory (ROM), flash memory . . . ) or some combination of the two. By way of example, the basic input/output system (BIOS), including basic routines to transfer information between elements within the computing device 700, such as during start-up, can be stored in nonvolatile memory, while volatile memory can act as external cache memory to facilitate processing by the processor(s) 710, among other things.

The storage device(s) 740 include removable/non-removable, volatile/nonvolatile storage media for storage of vast amounts of data relative to the memory 720. For example, storage device(s) 740 include, but are not limited to, one or more devices such as a magnetic or optical disk drive, floppy disk drive, flash memory, solid-state drive, or memory stick.

Memory 820 and storage device(s) 740 can include, or have stored therein, operating system 780, one or more applications 786, one or more program modules 784, and data 782. The operating system 780 acts to control and allocate resources of the computing device 700. Applications 786 include one or both of system and application software and can exploit management of resources by the operating system 780 through program modules 784 and data 782 stored in the memory 720 and/or storage device(s) 740 to perform one or more actions. Accordingly, applications 786 can turn a general-purpose computer 700 into a specialized machine in accordance with the logic provided thereby.

All or portions of the disclosed subject matter can be implemented using standard programming and/or engineering techniques to produce software, firmware, hardware, or any combination thereof to control the computing device 700 to realize the disclosed functionality. By way of example and not limitation, all or portions of the vehicle transaction system 100 can be, or form part of, the application 786, and include one or more modules 784 and data 782 stored in memory and/or storage device(s) 740 whose functionality can be realized when executed by one or more processor(s) 710.

In accordance with one particular embodiment, the processor(s) 710 can correspond to a system on a chip (SOC) or like architecture including, or in other words integrating, both hardware and software on a single integrated circuit substrate. Here, the processor(s) 710 can include one or more processors as well as memory at least similar to the processor(s) 710 and memory 720, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the vehicle transaction system 100 and/or functionality associated therewith can be embedded within hardware in a SOC architecture.

The input device(s) 750 and output device(s) 760 can be communicatively coupled to the computing device 700. By way of example, the input device(s) 750 can include a pointing device (e.g., mouse, trackball, stylus, pen, touch pad . . . ), keyboard, joystick, microphone, voice user interface system, camera, motion sensor, and a global positioning satellite (GPS) receiver and transmitter, among other things. The output device(s) 760, by way of example, can correspond to a display device (e.g., liquid crystal display (LCD), light emitting diode (LED), plasma, organic light-emitting diode display (OLED) . . . ), speakers, voice user interface system, printer, and vibration motor, among other things. The input device(s) 750 and output device(s) 760 can be connected to the computing device 700 by way of wired connection (e.g., bus), wireless connection (e.g., Wi-Fi, Bluetooth . . . ), or a combination thereof.

The computing device 700 can also include communication connection(s) 770 to enable communication with at least a second computing device 702 by means of a network 790. The communication connection(s) 770 can include wired or wireless communication mechanisms to support network communication. The network 790 can correspond to a local area network (LAN) or a wide area network (WAN) such as the Internet. The second computing device 702 can be another processor-based device with which the computing device 700 can interact. For example, the computing device 700 can correspond to a server that executes functionality of vehicle transaction system 100, and the second computing device 702 can be a user device that communications and interacts with the computing device 700.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A system, comprising:
a processor coupled to a memory that stores instructions that, when executed, cause the processor to:
construct a geofence around a location of a vehicle dealer;
detect a user device associated with a user entering the geofence;
identify one or more preferences of the user regarding a vehicle;
determine, in response to detecting the user device entering the geofence, that the user has entered the location of the vehicle dealer; and
in response to determining that the user has entered the location on the vehicle dealer:
access an inventory of the vehicle dealer,
determine a matching vehicle in the inventory based on the one or more preferences of the user regarding the vehicle,
provide directions to the matching vehicle,
detect a signal emitted by the user device associated with the user, wherein the signal indicates a location of the user device,
determine, based on the detected signal, the user device is within a predefined proximity of the matching vehicle, and
in response to determining that the user device is within the predefined proximity of the matching vehicle:
determine a user vehicle by analyzing a user purchase history or social media data;
determine a trade-in value of the user vehicle; and
provide details about the matching vehicle to the user device associated with the user, wherein the details about the matching vehicle comprise a reduced down payment based on the trade-in value of the user vehicle.

2. The system of claim 1, wherein the instructions, when executed, further cause the processor to notify the vehicle dealer of a presence of the user in response to determining that the user device has entered the location of the vehicle dealer.

3. The system of claim 1, wherein the instructions, when executed, further cause the processor to provide an offer corresponding to the matching vehicle to the user device associated with the user in response to determining that the user device is within the predefined proximity of the matching vehicle.

4. The system of claim 3, wherein the offer comprises a finance agreement for purchase or lease of the matching vehicle based on a credit worthiness of the user.

5. The system of claim 4, wherein the instructions, when executed, further cause the processor to:
- retrieve a set of customer information associated with the user;
- determine, based on the set of customer information, a set of finance variables; and
- generate the finance agreement based on the set of finance variables.

6. The system of claim 3, wherein the instructions, when executed, further cause the processor to:
- receive digital signatures associated with the user, the vehicle dealer, and a financing party for the offer to finalize a sale or a lease of the vehicle.

7. The system of claim 1, wherein the details about the matching vehicle provided to the user device include a repair record.

8. The system of claim 1, wherein determination the user device associated with the user is in proximity of the matching vehicle is based on input from a radio frequency identification (RFID), global positioning system (GPS), or internet of things (IoT) device.

9. A computer-implemented method, comprising:
- constructing a geofence around a location of a vehicle dealer;
- detecting a user device associated with a user entering the geofence;
- identifying one or more preferences of the user regarding a vehicle;
- determining, in response to detecting the user device entering the geofence that the user has entered the location of the vehicle dealer; and
- in response to determining that the user entered the location of the vehicle dealer:
  - accessing an inventory of the vehicle dealer;
  - determining a matching vehicle in the inventory based on the one or more preferences of the user regarding the vehicle,
  - providing directions to the matching vehicle,
  - detecting a signal emitted by the user device associated with the user, wherein the signal indicates a location of the user device,
  - determining, based on the detected signal, that the user device is within a predefined proximity of the matching vehicle, and
  - in response to determining that the user device is within the predefined proximity of the matching vehicle:
    - determining a user vehicle by analyzing a user purchase history or social media data;
    - determining a trade-in value of the user vehicle; and
    - providing details about the matching vehicle to the user device associated with the user, wherein the details about the matching vehicle comprise a reduced down payment based on the trade-in value of the user vehicle.

10. The computer-implemented method of claim 9, further comprising notifying the vehicle dealer of a presence of the user in response to determining that the user device has entered the location of the vehicle dealer.

11. The computer-implemented method of claim 9, further comprising providing an offer corresponding to the matching vehicle to the user device associated with the user in response to determining that the user device is within the predefined proximity of the matching vehicle.

12. The computer-implemented method of claim 11, wherein the offer comprises a finance agreement for purchase or lease of the matching vehicle based on a credit worthiness of the user.

13. The computer-implemented method of claim 12, wherein providing the finance agreement comprises:
- retrieving a set of customer information associated with the user;
- determining, based on the set of customer information, a set of finance variables; and
- generating the finance agreement based on the set of finance variables.

14. The computer-implemented method of claim 11, wherein the providing the offer further comprises:
- receiving digital signatures associated with the user, the vehicle dealer, and a financing party for the offer to finalize a sale or a lease of the vehicle.

15. The computer-implemented method of claim 9, wherein the details about the matching vehicle provided to the user device include a repair record.

16. A non-transitory computer-readable storage medium having instructions that, when executed, cause one or more processors to:
- construct a geofence around a location of a vehicle dealer;
- detect a user device associated with a user entering the geofence;
- identify one or more preferences of the user regarding a vehicle;
- determine, in response to detecting the user device entering the geofence, that the user has entered the location of the vehicle dealer; and
- in response to determining that the user has entered the location of the vehicle dealer:
  - access an inventory of the vehicle dealer,
  - determine a matching vehicle in the inventory based on the one or more preferences of the user regarding the vehicle,
  - provide directions to the matching vehicle,
  - detect a signal emitted by the user device associated with the user, wherein the signal indicates a location of the user device,
  - determine, based on the detected signal, that the user device is within a predefined proximity of the matching vehicle, and
  - in response to determining that the user device is within the predefined proximity of the matching vehicle:
    - determine a user vehicle by analyzing a user purchase history or social media data;
    - determine a trade-in value of the user vehicle; and
    - provide details about the matching vehicle to the user device associated with the user, wherein the details about the matching vehicle comprise a reduced down payment based on the trade-in value of the user vehicle.

17. The non-transitory computer-readable storage medium of claim 16, wherein the instructions, when executed, further cause the one or more processors to notify the vehicle dealer of a presence of the user in response to determining that the user device has entered the location of the vehicle dealer.

18. The non-transitory computer-readable storage medium of claim 16, wherein the instructions, when executed, further cause the one or more processors to provide an offer corresponding to the matching vehicle to the user device associated with the user in response to determining that the user device is within the predefined proximity of the matching vehicle.

19. The non-transitory computer-readable storage medium of claim 18, wherein the offer comprises a finance agreement for purchase or lease of the matching vehicle based on a credit worthiness of the user.

20. The non-transitory computer-readable storage medium of claim 19, wherein the instructions, when executed, further cause the one or more processors to:
- retrieve a set of customer information associated with the user;
- determine, based on the set of customer information, a set of finance variables; and
- generate the finance agreement based on the set of finance variables.

* * * * *